US012712455B2

(12) United States Patent
Shen et al.

(10) Patent No.: US 12,712,455 B2
(45) Date of Patent: Aug. 18, 2026

(54) DIRECT CURRENT(DC)-DC CONVERSION CIRCUITS FOR BALANCING DIRECT CURRENT BUSES

(71) Applicant: Santak Electronic (Shenzhen) Co., Ltd., Shenzhen (CN)

(72) Inventors: Zhimin Shen, Shenzhen (CN); Lei Cao, Shenzhen (CN); Binchuang Zhu, Shenzhen (CN); Yulong Hao, Shenzhen (CN); Jin Ouyang, Shenzhen (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 148 days.

(21) Appl. No.: 18/904,460

(22) Filed: Oct. 2, 2024

(65) Prior Publication Data

US 2025/0125723 A1 Apr. 17, 2025

(30) Foreign Application Priority Data

Oct. 13, 2023 (CN) ......................... 202311330412.7

(51) Int. Cl.

*H02M 3/158* (2006.01)
*H02J 7/34* (2006.01)
*H02J 9/06* (2006.01)
*H02M 7/487* (2007.01)

(52) U.S. Cl.

CPC ............... *H02M 3/158* (2013.01); *H02J 7/34* (2013.01); *H02M 7/487* (2013.01); *H02J 9/06* (2013.01); *H02J 2207/20* (2020.01)

(58) Field of Classification Search

CPC .......... H02M 3/158; H02M 7/487; H02J 7/34; H02J 9/06; H02J 2207/20

See application file for complete search history.

(56) References Cited

U.S. PATENT DOCUMENTS

| | | | | |
|---|---|---|---|---|
| 2012/0319664 A1* | 12/2012 | Fujii | H02J 7/345 | 323/271 |
| 2014/0292303 A1* | 10/2014 | Zubieta | H02M 3/155 | 323/355 |
| 2025/0373067 A1* | 12/2025 | Cao | H02J 9/061 | |

FOREIGN PATENT DOCUMENTS

| | | | |
|---|---|---|---|
| CN | 103414338 B * | 9/2015 | |
| CN | 212063839 U * | 12/2020 | |
| CN | 121710468 A * | 3/2026 | |
| WO | WO-2016124079 A1 * | 8/2016 | H02J 7/50 |

* cited by examiner

*Primary Examiner* — Sisay G Tiku

(74) *Attorney, Agent, or Firm* — Stanek Lemon Crouse & Meeks, PA

(57) ABSTRACT

A direct current (DC)-DC conversion circuit for balancing direct current buses is provided, including: a first switching transistor, a second switching transistor, a third switching transistor, and a fourth switching transistor that are connected in series between direct current buses, and are respectively connected in antiparallel with a diode; a first inductor, one end of which is connected to a positive electrode of a battery, and a second end is connected to a first node; a second inductor, one end of which is connected to a negative electrode of the battery, and a second end of which is connected to a third node; a first switch, connected between the first inductor and the positive electrode of the battery or between the second inductor and the negative electrode of the battery; and a third switch and a third inductor that are connected in parallel, connected between a second node and a ground.

10 Claims, 5 Drawing Sheets

DIRECT CURRENT(DC)-DC CONVERSION CIRCUITS FOR BALANCING DIRECT CURRENT BUSES

CROSS-REFERENCE TO RELATED APPLICATION

This application claims priority to Chinese Application No. 202311330412.7, filed Oct. 13, 2023, the content of which is hereby incorporated herein by reference in its entirety.

TECHNICAL FIELD

The present inventive concept relates to the field of power electronics, and in particular, to a direct current (DC)-DC conversion circuit for balancing direct current buses.

BACKGROUND

In some uninterruptible power supplies (UPS), a rectifier bridge arm is used during discharging of a battery, a direct current (DC)-DC converter of the battery is only used for charging, and direct current bus voltages cannot be balanced. Therefore, an additional balancing bridge arm is needed to balance the direct current bus voltages. The additional balancing bridge arm leads to an increase in a quantity of semiconductor devices in the UPS, higher system costs, and a reduction in integrated power density of modules. Therefore, a simple circuit and a method are needed to balance the direct current bus voltages.

SUMMARY

In view of the difficulties discussed above with conventional technology, the present inventive concept provides a DC-DC conversion circuit for balancing direct current buses, including: a first switching transistor, a second switching transistor, a third switching transistor, and a fourth switching transistor that are connected in series between direct current buses, where the first switching transistor, the second switching transistor, the third switching transistor, and the fourth switching transistor are respectively connected in antiparallel with a first diode, a second diode, a third diode, and a fourth diode; a first inductor, one end of which is connected to a positive electrode of a battery, and a second end of which is connected to a first node between the first switching transistor and the second switching transistor; a second inductor, one end of which is connected to a negative electrode of the battery, and a second end of which is connected to a third node between the third switching transistor and the fourth switching transistor; a first switch, connected between the first inductor and the positive electrode of the battery or between the second inductor and the negative electrode of the battery; and a third switch and a third inductor that are connected in parallel, connected between a second node, between the second switching transistor and the third switching transistor, and a ground, where the first switch and the third switch are controlled to implement a balance between a positive direct current bus and a negative direct current bus.

In some embodiments, the DC-DC conversion circuit further includes: a second switch, which is connected between the negative electrode of the battery and the second inductor, where the first switch is connected between the positive electrode of the battery and the first inductor, and a switching mode of the second switch is the same as that of the first switch.

In some embodiments, the DC-DC conversion circuit further includes: a fifth diode, an anode of which is connected to the ground and a cathode of which is connected to the first node.

In some embodiments, the DC-DC conversion circuit further includes: a sixth diode, a cathode of which is connected to the ground and an anode of which is connected to the third node.

In some embodiments, an anode of the first diode is connected to the first node, a cathode of the first diode is connected to the positive direct current bus, an anode of the second diode is connected to the second node, a cathode of the second diode is connected to the first node, an anode of the third diode is connected to the third node, a cathode of the third diode is connected to the second node, an anode of the fourth diode is connected to the negative direct current bus, and a cathode of the fourth diode is connected to the third node.

In some embodiments, when the first switch and the third switch are switched on, the DC-DC conversion circuit operates in a charging-discharging mode, and when the first switch and the third switch are switched off, the DC-DC conversion circuit operates in a balancing mode.

In some embodiments, in the balancing mode and when a current of the third inductor is greater than 0 (i.e., a current direction in which the inductor current flows from the second node to the ground), the first switching transistor and the second switching transistor receive the same PWM signal, and the third switching transistor and the fourth switching transistor are switched off; when the first switching transistor and the second switching transistor are switched on, a current path of the conversion circuit is: the positive current bus—the first switching transistor—the second switching transistor—the third inductor—the ground; and when the first switching transistor and the second switching transistor are switched off, a current path of the conversion circuit is: the negative direct current bus—the fourth diode—the third diode—the third inductor—the ground.

In some embodiments, in the balancing mode and when a current of the third inductor is less than 0 (i.e., a current direction in which the inductor current flows from the ground to the second node), the third switching transistor and the fourth switching transistor receive the same PWM signal, and the first switching transistor and the second switching transistor are switched off; when the third switching transistor and the fourth switching transistor are switched on, a current path of the conversion circuit is: the ground—the third inductor—the third switching transistor—the fourth switching transistor—the negative direct current bus; and when the third switching transistor and the fourth switching transistor are switched off, a current path of the conversion circuit is: the ground—the third inductor—the second diode—the first diode—the positive direct current bus.

In some embodiments, the first inductor and the second inductor are mutually coupled inductors.

In some embodiments, the first switch, the second switch, and the third switch are relays, circuit breakers, IGBTs, or MOSFETs.

The DC-DC conversion circuit for balancing direct current buses in the present inventive concept can operate in a charging mode, a discharging mode, and a balancing mode, thereby effectively saving system costs, reducing a quantity of semiconductor devices, and improving integrated power density of the system.

DETAILED DESCRIPTION

To make the objectives, technical solutions, and advantages of the present inventive concept clearer, the following further describes the present inventive concept in detail through the embodiments with the reference to the accompanying drawings. It should be noted that the embodiments provided in the present inventive concept are used only for description, and are not intended to limit the protection scope of the present inventive concept.

Figure 1:
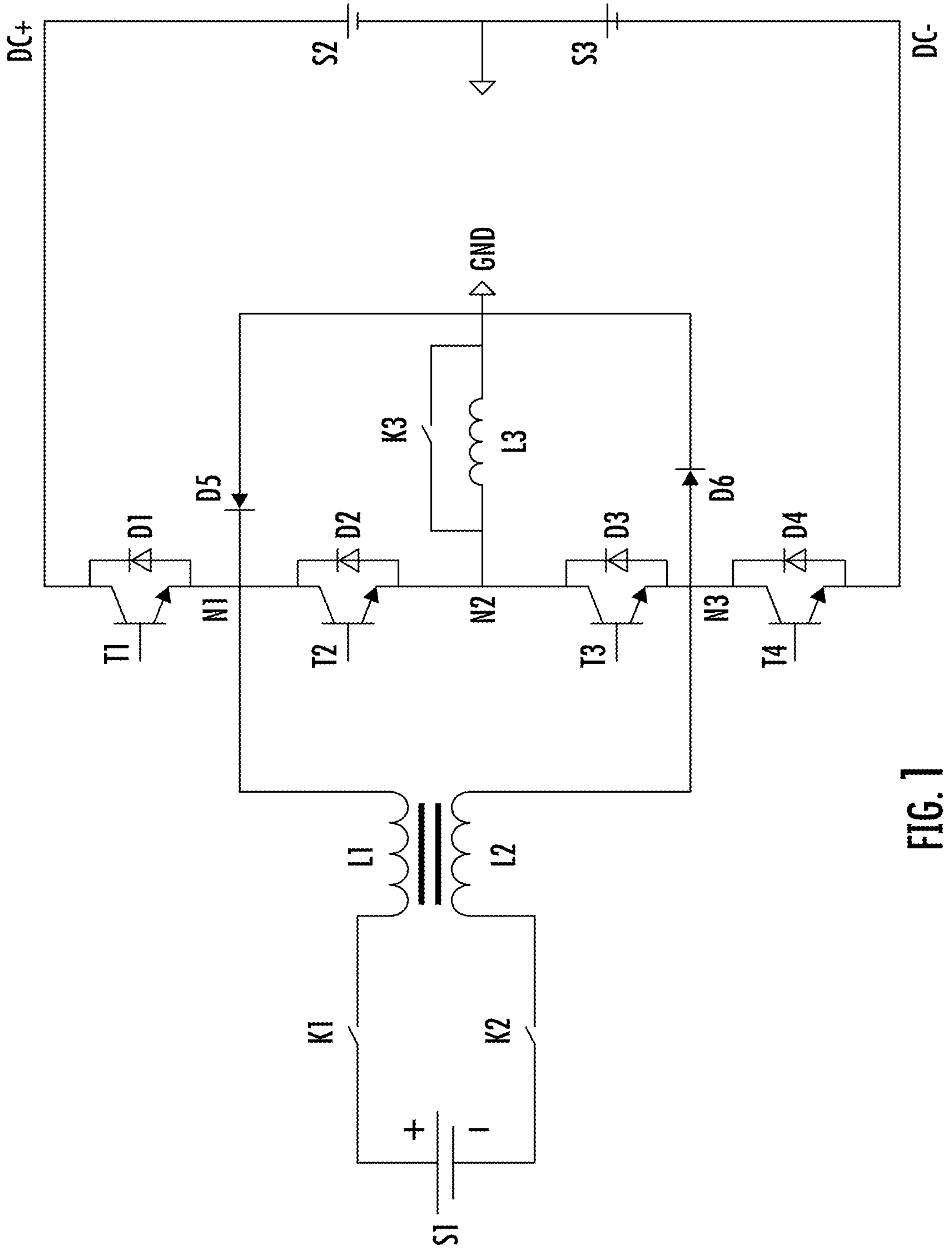
FIG. 1 shows a circuit diagram of a direct current (DC)-DC conversion circuit for balancing direct current buses according to some embodiments of the present inventive concept.

FIG. 1 shows a circuit diagram of a DC-DC conversion circuit for balancing direct current buses according to some embodiments of the present inventive concept. As shown in FIG. 1, the DC-DC conversion circuit includes: a switching transistor T1, a switching transistor T2, a switching transistor T3, and a switching transistor T4 that are connected in series between direct current buses, where the switching transistor T1, the switching transistor T2, the switching transistor T3, and the switching transistor T4 are respectively connected in antiparallel with a diode D1, a diode D2, a diode D3, and a diode D4, there is a node N1 between the switching transistor T1 and the switching transistor T2, there is a node N2 between the switching transistor T2 and the switching transistor T3, and there is a node N3 between the switching transistor T3 and the switching transistor T4; an inductor L1, one end of which is connected to a switch K1, and the second end of which is connected to the node N1; the switch K1, one end of which is connected to an inductor L1, and the second end of which is connected to a positive electrode of a battery S1; an inductor L2, one end of which is connected to a switch K2, and the second end of which is connected to the node N3; the switch K2, one end of which is connected to the inductor L2, and the second end of which is connected to a negative electrode of the battery S1; an inductor L3, one end of which is connected to the node N2, and the second end of which is connected to a ground GND; a switch K3, connected in parallel to both ends of the inductor L3; a diode D5, a cathode of which is connected to the node N1, and an anode of which is connected to the ground GND; and a diode D6, an anode of which is connected to the node N3, and a cathode of which is connected to the ground GND.

The switching transistor T1 has a first terminal connected to a positive current bus DC+, a second terminal connected to the switching transistor T2, and a control terminal configured to receive a control signal. An anode of the diode D1 is connected to the second terminal of the switching transistor T1, and a cathode of the diode D1 is connected to the first terminal of the switching transistor T1. The switching transistor T2 has a first terminal connected to the switching transistor T1, a second terminal connected to the switching transistor T3, and a control terminal configured to receive a control signal. An anode of the diode D2 is connected to the second terminal of the switching transistor T2, and a cathode of the diode D2 is connected to the first terminal of the switching transistor T2. The switching transistor T3 has a first terminal connected to the switching transistor T2, a second terminal connected to the switching transistor T4, and a control terminal configured to receive a control signal. An anode of the diode D3 is connected to the second terminal of the switching transistor T3, and a cathode of the diode D3 is connected to the first terminal of the switching transistor T3. The switching transistor T4 has a first terminal connected to the switching transistor T3, a second terminal connected to a negative direct current bus DC−, and a control terminal configured to receive a control signal. An anode of the diode D4 is connected to the second terminal of the switching transistor T4, and a cathode of the diode D4 is connected to the first terminal of the switching transistor T4.

In some embodiments, the control terminals of the switching transistors T1-T4 are configured to receive PWM signals. Although the switching transistors T1-T4 in FIG. 1 are shown as NPN structures, the present inventive concept is not limited thereto, and the switching transistors T1-T4 may also be implemented as PNP structures. In some embodiments, the switching transistors T1-T4 include but are not limited to insulated gate bipolar transistors (IGBT) or metal-oxide semiconductor field-effect transistors (MOSFET). In some embodiments, the switching transistors T1 and T4 are IGBTs of 950 V, the switching transistors T2 and T3 are IGBTs of 650 V, and specifications of the switching transistors T1-T4 may be adjusted according to power requirements.

In some embodiments, the switches K1-K3 may be implemented as relays, circuit breakers, IGBTs, MOSFETs, or the like.

In FIG. 1, a voltage between the direct current buses is shown by using power supplies S2 and S3. In the present inventive concept, a voltage of the positive direct current bus DC+ is V+, and a voltage of the negative direct current bus DC− is V−.

The following describes a charging mode, a discharging mode, and a balancing mode of the DC-DC conversion circuit for balancing direct current buses according to the present inventive concept with reference to FIG. 2 to FIG. 5.

Figure 2:
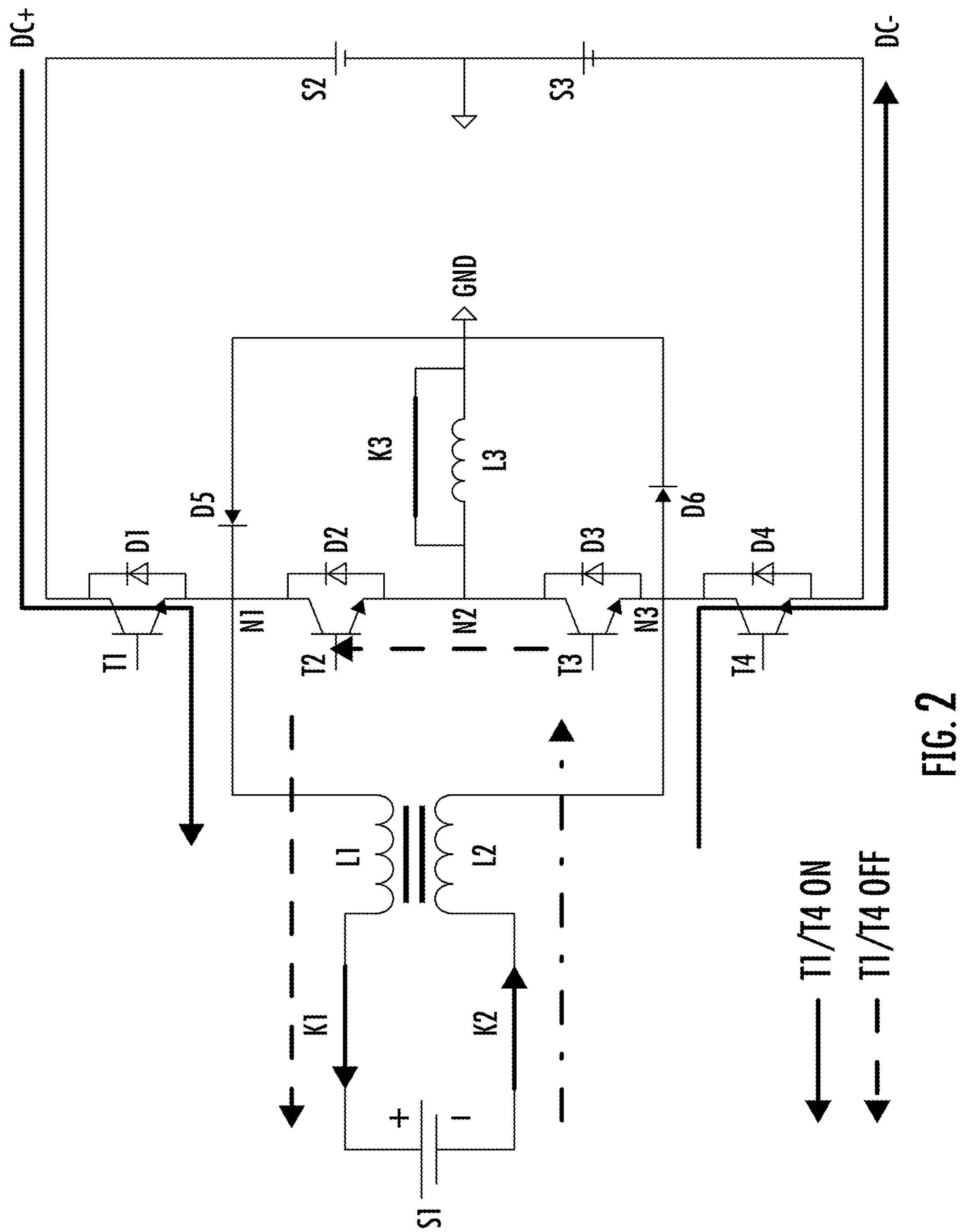
FIG. 2 shows a current path of a DC-DC conversion circuit for balancing direct current buses in a charging mode in accordance with some embodiments of the present inventive concept.

FIG. 2 shows a current path of a DC-DC conversion circuit for balancing direct current buses in a charging mode. In the charging mode, switches K1, K2, and K3 are switched on, control terminals of switching transistors T1 and T4 receive the same PWM signal and are periodically switched on or switched off, and switching transistors T2 and T3 remain switched off.

When the switching transistors T1 and T4 are switched on, a current path of the conversion circuit is shown by solid line arrows in FIG. 2, that is, a positive direct current bus DC+—the switching transistor T1—an inductor L1—the switch K1—a positive electrode of a battery—a negative electrode of the battery—the switch K2—an inductor L2—the switching transistor T4—a negative direct current bus DC−. In this case, the direct current buses charge the battery S1 and simultaneously store energy in the inductors L1 and L2. The inductors L1 and L2 enable the current from the direct current buses to rise slowly, preventing the battery S1 from being damaged by an excessive current.

When the switching transistors T1 and T4 are switched off, a current path of the conversion circuit is shown by dashed line arrows in FIG. 2, that is, the negative electrode of the battery—the switch K2—the inductor L2—a diode D3—a diode D2—the inductor L1—the switch K1—the positive electrode of the battery. In this case, the energy stored in the inductors L1 and L2 is discharged, to charge the battery S1 at the same time.

Figure 3:
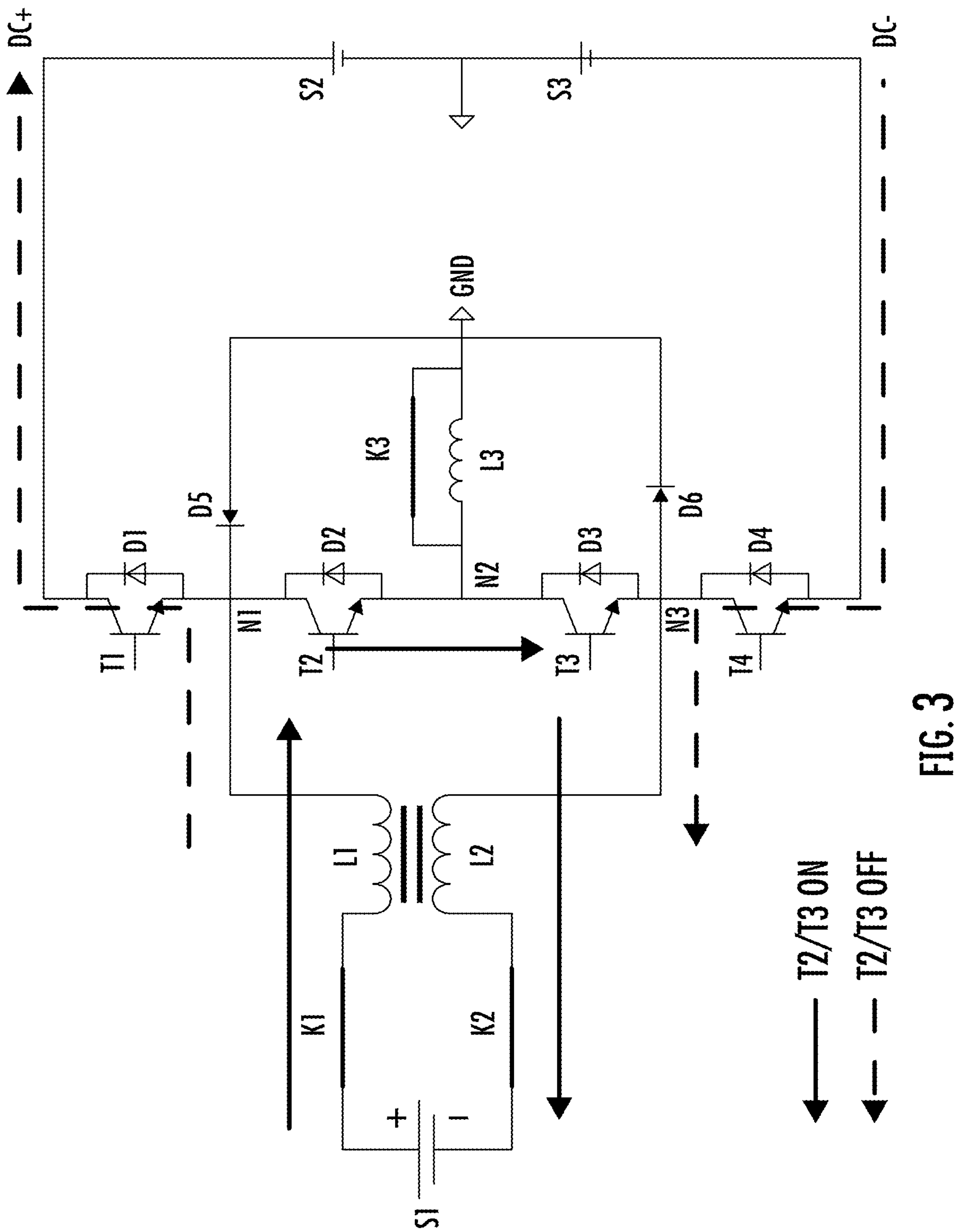
FIG. 3 shows a current path of a DC-DC conversion circuit for balancing direct current buses in a discharging mode in accordance with some embodiments of the present inventive concept.

FIG. 3 shows a current path of a DC-DC conversion circuit for balancing direct current buses in a discharging mode. In the discharging mode, switches K1, K2, and K3 are switched on, control terminals of switching transistors T2 and T3 receive the same PWM signal and are periodically switched on or switched off, and switching transistors T1 and T4 remain switched off.

When the switching transistors T2 and T3 are switched on, a current path of the conversion circuit is shown by solid line arrows in FIG. 3, that is, a positive electrode of a battery—the switch K1—an inductor L1—the switching transistor T2—the switching transistor T3—an inductor L2—the switch K2—a negative electrode of the battery. In this case, the battery S1 discharges electric energy into the inductors L1 and L2, and the electric energy is stored in the inductors L1 and L2.

When the switching transistors T2 and T3 are switched off, a current path of the conversion circuit is shown by dotted line arrows in FIG. 3, that is, the inductor L1—a diode D1—a positive direct current bus DC+—a negative direct current bus DC−—a diode D4—the inductor L2. In this case, the inductors L1 and L2 discharge the stored energy to the direct current buses.

Figure 4:
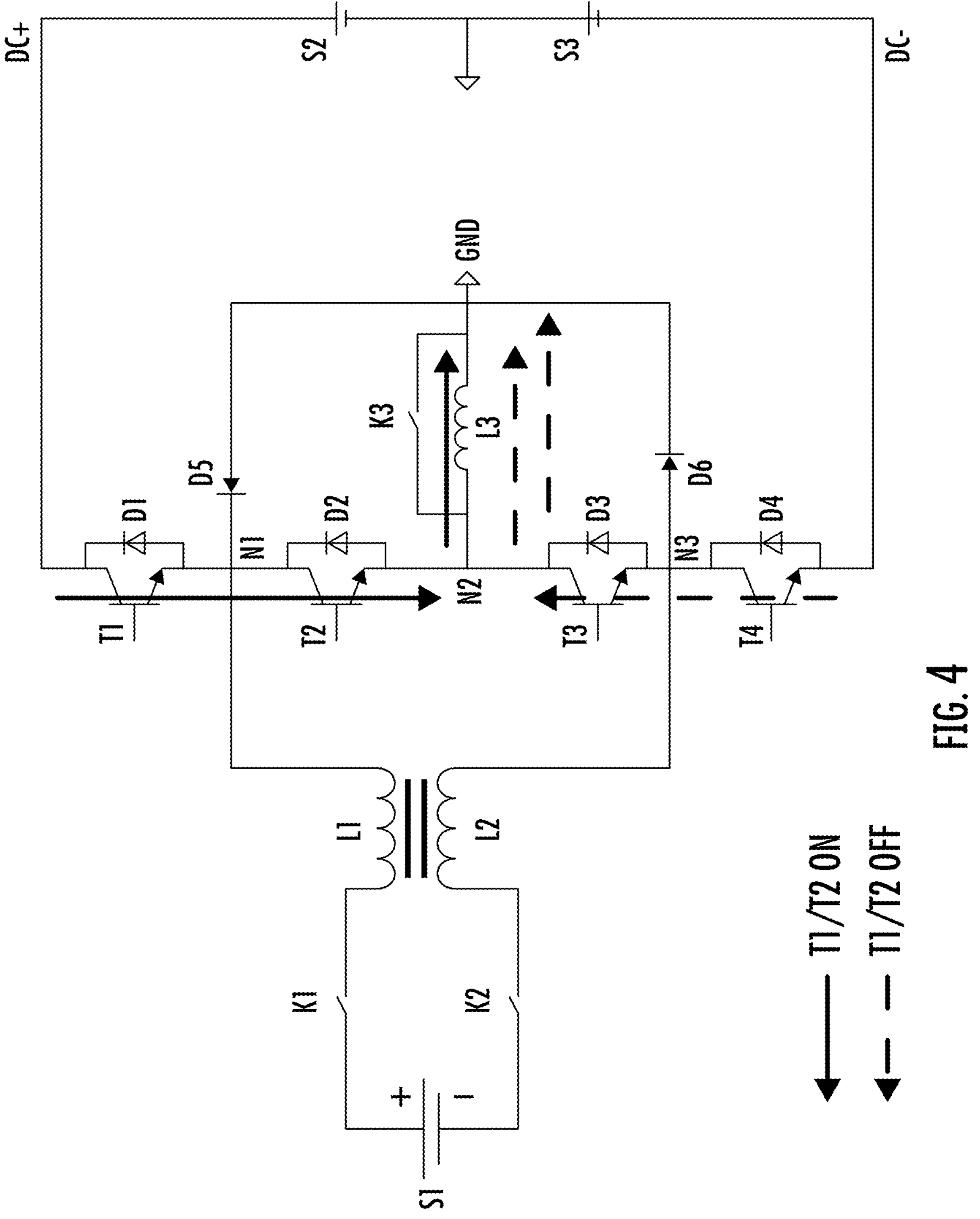
FIG. 4 shows a current path of a DC-DC conversion circuit for balancing direct current buses in a balancing mode with an inductor current greater than 0 in accordance with some embodiments of the present inventive concept.

FIG. 4 shows a current path of a DC—DC conversion circuit for balancing direct current buses in a balancing mode with an inductor current greater than 0 (i.e., a current direction in which the inductor current flows from a node N2 to a ground GND). That is, a voltage amplitude V+ of a positive direct current bus DC+ is greater than a voltage amplitude |V−| of a negative direct current bus DC−. In this mode, switches K1, K2, and K3 are switched off, control terminals of switching transistors T1 and T2 receive the same PWM signal and are periodically switched on or switched off, and switching transistors T3 and T4 remain switched off.

When the switching transistors T1 and T2 are switched on, a current path of the conversion circuit is shown by solid line arrows in FIG. 4, that is, the positive direct current bus DC+—the switching transistor T1—the switching transistor T2—an inductor L3—a ground GND. In this case, electric energy of the positive direct current bus DC+ is discharged, so that the voltage amplitude V+ of the positive direct current bus DC+ decreases, and finally, the voltage amplitude V+ of the positive direct current bus DC+ is equal to the voltage amplitude |V−| of the negative direct current bus DC−. The inductor L3 is configured to store energy.

When the switching transistors T1 and T2 are switched off, a current path of the conversion circuit is shown by dashed line arrows in FIG. 4, that is, the negative direct current bus DC−—a diode D4—a diode D3—the inductor L3—the ground GND. In this case, electric energy of the negative direct current bus DC− is discharged, so that the voltage amplitude |V−| of the negative direct current bus DC− increases, and finally, the voltage amplitude V+ of the positive direct current bus DC+ is equal to the voltage amplitude |V−| of the negative direct current bus DC−. The inductor L3 is configured to store energy.

Figure 5:
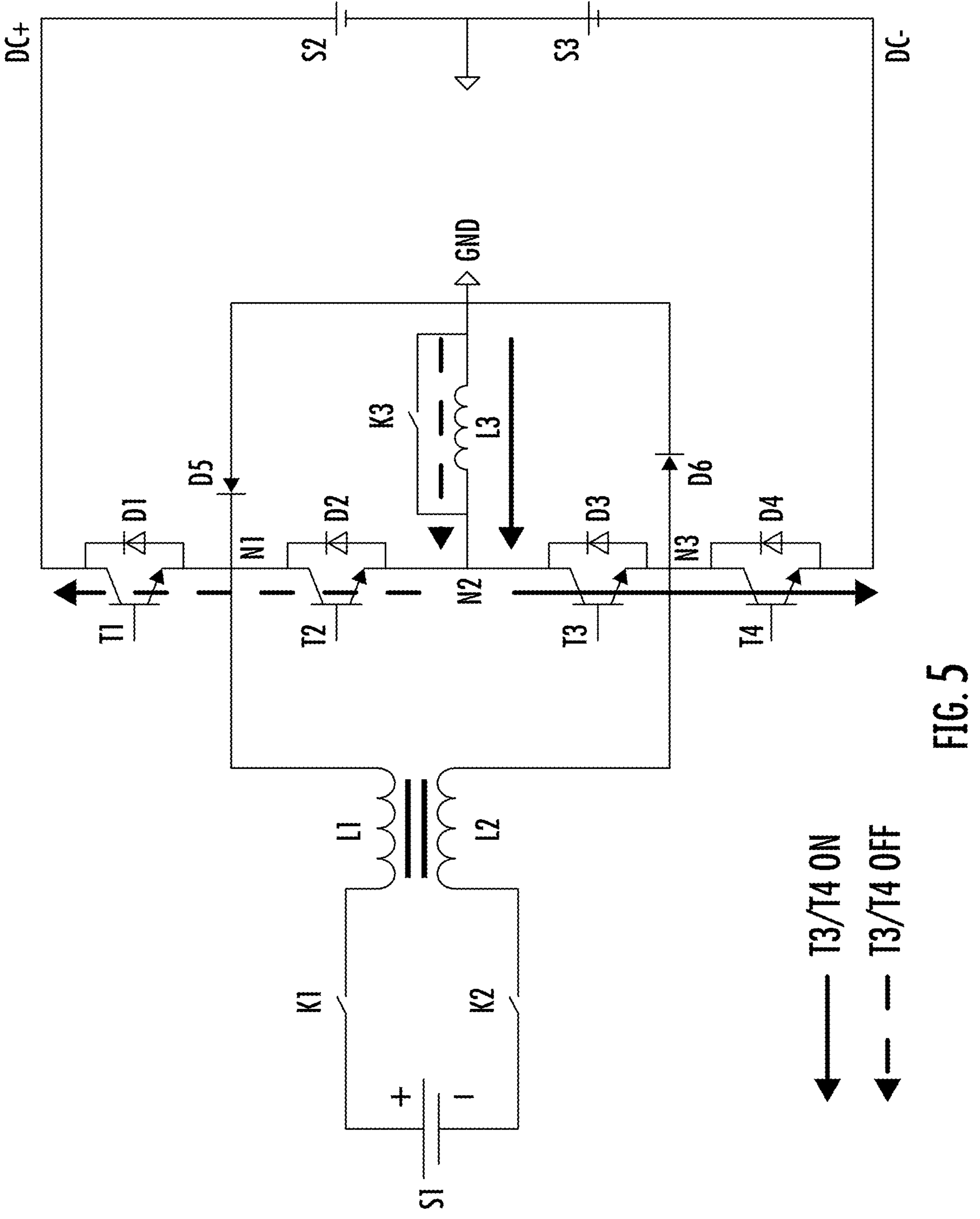
FIG. 5 shows a current path of a DC-DC conversion circuit for balancing direct current buses in a balancing mode with an inductor current less than 0 in accordance with some embodiments of the present inventive concept.

FIG. 5 shows a current path of a DC-DC conversion circuit for balancing direct current buses in a balancing mode with an inductor current less than 0 (i.e., a current direction in which the inductor current flows from a ground GND to a node N2). That is, a voltage amplitude V+ of a positive direct current bus DC+ is less than a voltage amplitude |V−| of a negative direct current bus DC−. In this mode, switches K1, K2, and K3 are switched off, control terminals of switching transistors T3 and T4 receive the same PWM signal and are periodically switched on or switched off, and switching transistors T1 and T2 remain switched off.

When the switching transistors T3 and T4 are switched on, a current path of the conversion circuit is shown by solid line arrows in FIG. 5, that is, the ground GND—an inductor L3—the switching transistor T3—the switching transistor T4—the negative direct current bus DC−. In this case, electric energy stored in the inductor L3 is discharged to the negative direct current bus DC−, so that the voltage amplitude |V−| of the negative direct current bus DC—decreases, and finally, the voltage amplitude V+ of the positive direct current bus DC+ is equal to the voltage amplitude |V−| of the negative direct current bus DC−. The inductor L3 is configured to provide electric energy.

When the switching transistors T3 and T4 are switched off, a current path of the conversion circuit is shown by dashed line arrows in FIG. 5, that is, the ground GND—the inductor L3—a diode D2—a diode D1—the positive direct current bus DC+. In this case, the electric energy stored in the inductor L3 is discharged to the positive direct current bus DC+, so that the voltage amplitude V+ of the positive direct current bus DC+ increases, and finally, the voltage amplitude V+ of the positive direct current bus DC+ is equal to the voltage amplitude |V−| of the negative direct current bus DC−. The inductor L3 is configured to provide electric energy.

A diode D5 is configured to provide voltage balancing for the switching transistors T1 and T2 in the balancing mode, and a diode D6 is configured to provide voltage balancing for the switching transistors T3 and T4 in the balancing mode, to prevent the switching transistors from being damaged by excessive voltages, thereby improving system reliability. For example, with reference to FIG. 5, in the balancing mode with an inductor current less than 0 and the switching transistors T3 and T4 switched on, a voltage at the node N2 is V−, and therefore a voltage shared by the switching transistors T1 and T2 is V+-V−. If there is no diode D5, there may be uneven voltage division between switching transistors T1 and T2. If the voltages of the switching transistors T1 or T2 are too large, the switching transistors may be damaged. When the diode D5 exists, a voltage at a node N1 is approximately-0.7 V, a voltage on the switching transistor T2 is −0.7-V−, and a voltage on the switching transistor T1 is (V+)-(−0.7 V). Therefore, when the voltages of the direct current buses are balanced, the voltages on the switching transistors T1 and T2 are basically the same. In some embodiments, the diodes D5 and D6 are small-current Schottky diodes. In some embodiments, the diodes D5 and D6 may be omitted if the switching transistors T1-T4 can withstand a sufficiently high voltage.

Although two switches K1 and K2 are shown in the foregoing embodiments, those skilled in the art should understand that the switches K1 and K2 are configured to disconnect a current path between the battery S1 and the inductors L1 and L2. Therefore, the technical solution of the present inventive concept can also be implemented by using only one switch.

In one embodiment, the inductors L1 and L2 are two inductors that are mutually independent. In another embodiments, the inductors L1 and L2 are mutually coupled inductors.

The DC-DC conversion circuit for balancing direct current buses in the present inventive concept can operate in a charging mode, a discharging mode, and a balancing mode, thereby effectively saving system costs, reducing a quantity of semiconductor devices, and improving integrated power density of the system.

Although the present inventive concept has been described by using preferred embodiments, the present inventive concept is not limited to the embodiments described herein, and includes various changes and variations without departing from the scope of the present inventive concept.

What is claimed is:

1. A direct current (DC)-DC conversion circuit for balancing direct current buses, comprising:

a first switching transistor, a second switching transistor, a third switching transistor, and a fourth switching transistor that are connected in series between direct current buses, wherein the first switching transistor, the second switching transistor, the third switching transistor, and the fourth switching transistor are respectively connected in antiparallel with a first diode, a second diode, a third diode, and a fourth diode;

a first inductor, one end of which is connected to a positive electrode of a battery, and a second end of which is connected to a first node between the first switching transistor and the second switching transistor;

a second inductor, one end of which is connected to a negative electrode of the battery, and a second end of which is connected to a third node between the third switching transistor and the fourth switching transistor;

a first switch, connected between the first inductor and the positive electrode of the battery or between the second inductor and the negative electrode of the battery; and a third switch and a third inductor that are connected in parallel, connected between a second node, between the second switching transistor and the third switching transistor, and a ground, wherein the first switch and the third switch are controlled to implement a balance between a positive direct current bus and a negative direct current bus.

2. The DC-DC conversion circuit for balancing direct current buses of claim 1, further comprising: a second switch, which is connected between the negative electrode of the battery and the second inductor, wherein the first switch is connected between the positive electrode of the battery and the first inductor, and a switching mode of the second switch is a same switching mode as that of the first switch.

3. The DC-DC conversion circuit for balancing direct current buses of claim 2, wherein the first switch, the second switch, and the third switch are relays, circuit breakers, IGBTs, or MOSFETs.

4. The DC-DC conversion circuit for balancing direct current buses of claim 1, further comprising:

a fifth diode, an anode of which is connected to the ground and a cathode of which is connected to the first node.

5. The DC-DC conversion circuit for balancing direct current buses of claim 1, further comprising:

a sixth diode, a cathode of which is connected to the ground and an anode of which is connected to the third node.

6. The DC-DC conversion circuit for balancing direct current buses of claim 1, wherein an anode of the first diode is connected to the first node, a cathode of the first diode is connected to the positive direct current bus, an anode of the second diode is connected to the second node, a cathode of the second diode is connected to the first node, an anode of the third diode is connected to the third node, a cathode of the third diode is connected to the second node, an anode of the fourth diode is connected to the negative direct current bus, and a cathode of the fourth diode is connected to the third node.

7. The DC-DC conversion circuit for balancing direct current buses of claim 1, wherein when the first switch and the third switch are switched on, the DC-DC conversion circuit operates in a charging-discharging mode, and when the first switch and the third switch are switched off, the DC-DC conversion circuit operates in a balancing mode.

8. The DC-DC conversion circuit for balancing direct current buses of claim 7, wherein in the balancing mode and when a current of the third inductor is greater than 0, the first switching transistor and the second switching transistor receive a same PWM signal, and the third switching transistor and the fourth switching transistor are switched off;

when the first switching transistor and the second switching transistor are switched on, a current path of the conversion circuit is: the positive current bus—the first switching transistor—the second switching transistor—the third inductor—the ground; and when the first switching transistor and the second switching transistor are switched off, a current path of the conversion circuit is: the negative direct current bus—the fourth diode—the third diode—the third inductor—the ground.

9. The DC-DC conversion circuit for balancing direct current buses of claim 7, wherein in the balancing mode and when a current of the third inductor is less than 0, the third switching transistor and the fourth switching transistor receive a same PWM signal, and the first switching transistor and the second switching transistor are switched off;

when the third switching transistor and the fourth switching transistor are switched on, a current path of the conversion circuit is: the ground—the third inductor—the third switching transistor—the fourth switching transistor—the negative direct current bus; and when the third switching transistor and the fourth switching transistor are switched off, a current path of the conversion circuit is: the ground—the third inductor—the second diode—the first diode—the positive direct current bus.

10. The DC-DC conversion circuit for balancing direct current buses of claim 1, wherein the first inductor and the second inductor are mutually coupled inductors.

* * * * *